(12) United States Patent
Wiegert et al.

(10) Patent No.: US 6,476,610 B1
(45) Date of Patent: Nov. 5, 2002

(54) MAGNETIC ANOMALY SENSING SYSTEM AND METHODS FOR MANEUVERABLE SENSING PLATFORMS

(75) Inventors: Roy F. Wiegert, Panama City; Brian L. Price, Panama City Beach, both of FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/840,694

(22) Filed: Apr. 24, 2001

(51) Int. Cl.[7] ........................... G01V 3/08; G01V 3/165; G01V 3/38

(52) U.S. Cl. ....................... 324/345; 324/225; 324/247; 324/326

(58) Field of Search ................................. 324/326, 345, 324/346, 244–260, 225; 33/355 R, 361, 363 R, 356, 357

(56) References Cited

U.S. PATENT DOCUMENTS 5,585,726 A * 12/1996 Chau ........................... 324/326
6,212,476 B1 * 4/2001 Noy et al. ..................... 702/9

* cited by examiner

*Primary Examiner*—Edward Lefkowitz
*Assistant Examiner*—Reena Aurora
(74) *Attorney, Agent, or Firm*—Donald G. Peck; Harvey A. Gilbert

(57) ABSTRACT

A system and method for sensing magnetic anomalies uses a gradiometer having at least one pair of triaxial magnetometer-accelerometer (TMA) sensors. Each TMA sensor has X, Y, Z magnetic sensing axes and X, Y, Z acceleration sensing axes that are parallel to one another and to the X, Y, Z magnetic sensing and acceleration axes of all other TMA sensors. Each TMA sensor outputs components $(B_x, B_y, B_z)$ of local magnetic fields and components $(A_x, A_y, A_z)$ of local gravitational acceleration fields. The components $(B_x, B_y, B_z)$ and $(A_x, A_y, A_z)$ output from each TMA sensor are processed to generate motion-compensated components $(B_{cx}, B_{cy}, B_{cz})$ of local magnetic fields. A difference is generated between the motion-compensated components $(B_{cx}, B_{cy}, B_{cz})$ for each pair of TMA sensors thereby generating differential vector field components $(\Delta B_x, \Delta B_y, \Delta B_z)$. For improved accuracy, the differential vector field components $(\Delta B_x, \Delta B_y, \Delta B_z)$ are adjusted using the local gravitational acceleration field components and motion-compensated local magnetic field components in order to compensate for gradiometer motion. Gradient components are generated using the differential vector field components $(\Delta B_x, \Delta B_y, \Delta B_z)$. In general, for each of the magnetic sensing axes, the gradient components $G_{ij}$ are defined by $(\Delta B_x/\Delta_j, \Delta B_y/\Delta_j, \Delta B_z/\Delta_j)$, wherein $\Delta_j$ is a distance between a pair of TMA sensors relative to a j-th one of the X, Y, Z magnetic sensing axes. A scalar-quantity gradient contraction defined as $$C^2 = \sum_{i,j} (G_{ij})^2$$

is generated for each pair of TMA sensors. The gradient contraction $C^2$ is a robust, rotationally-invariant quantity that changes monotonically with proximity to a magnetic target.

20 Claims, 7 Drawing Sheets

MAGNETIC ANOMALY SENSING SYSTEM AND METHODS FOR MANEUVERABLE SENSING PLATFORMS

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to magnetic sensors, and more particularly to a maneuverable magnetic anomaly sensing system and method that is rotationally invariant and that provides robust magnetic target detection and localization information.

BACKGROUND OF THE INVENTION

Magnetic sensor technologies are being developed to enhance the capabilities of highly-maneuverable autonomous underwater vehicles (AUVs) and other underwater systems. These underwater systems can include navigation, communications and "detection, localization and classification" (DLC) of underwater objects/obstructions or buried objects such as cables or mines. Magnetic sensors can detect and use the static and dynamic magnetic anomaly fields that emanate from magnetically polarizable underwater objects to localize/classify the objects. The low frequency magnetic anomaly signals are not affected by water turbulence and multi-path propagation effects that can limit the performance of other underwater sensing technologies.

Practical constraints on magnetic sensor operation aboard small underwater vehicles impose serious technical challenges principally due to the following factors. First, changes in vehicle orientation in the earth's background magnetic induction field $B_E$ of 50,000 nano-Tesla (nT) produces large non-target-related changes in the nT-level vector components measured by onboard vector magnetometers. As is the case for any mobile application of low frequency magnetic sensors, in order to obtain useful detection sensitivity and range, the adverse effects of sensor rotation in the earth's field must be eliminated or reduced to an acceptable level in the design of the field-sensing element or compensated by means of signal processing software. However, for small underwater vehicles, the adverse effects of sensor motion are exacerbated because their operation typically involves frequent large, nearly random changes in vehicle orientation due to water turbulence and the effects of uneven seafloor structure.

A second factor hampering magnetic sensor operation onboard small underwater vehicles is that the magnetic signatures of a vehicle's frame, drive motors and other vehicle subsystems may obscure the magnetic signature of a magnetic anomaly which can be indicative of a target object or a communication signal. Hence, in order to achieve effective sensitivity and range, reasonable efforts should be made to reduce the vehicle magnetic signature as much as is practical, to locate the magnetic sensors as far as practical from the magnetically "hot" sections of the vehicle, and to utilize sensor calibration and signal processing techniques that compensate for the non-target-related fields and gradients that are produced by the vehicle's self-magnetic signature.

In addition, the vehicle's limited size and power budget requires the sensing system to be compact, low power and easily portable. The system must combine hardware, software and an efficient target location methodology to optimize the vehicle's search capabilities. These technical problems are somewhat mitigated by the relatively reduced detection range requirements that are allowed by the operational paradigm of detection, localization and classification of magnetic objects using smart AUVs. In this paradigm, the AUV can adaptively modify its search patterns in response to the detected presence of objects, and, for example, autonomously maneuver (under guidance from an efficient magnetic sensor based homing algorithm) so as to maximize its probability of accurately localizing and classifying an object once it is detected.

A brief review is presented of some relevant physical and mathematical concepts that affect the design, development and use of magnetic sensing technologies. Throughout this disclosure, vector quantities are denoted by boldface letters and scalar quantities by normal type. For example, $B_A$ is a vector while $B_A$ is a scalar value or quantity. The methodologies and apparatus used for detection, localization and classification of magnetic "anomalies" that are produced by magnetic objects are based on and conditioned by:

1) The existence of vector magnetic induction fields $B_A$ that emanate from the objects' net magnetization (characterized as a vector "magnetic dipole moment" M) and,
2) The existence of the relatively large magnetic induction field of the earth $B_E$ that permeates all space around the planetary surface.

FIG. 1 presents a simplified qualitative representation of magnetic field lines of force. As designated by the arrowheads in FIG. 1, the ($B_A$) field lines leave one end (i.e., the north pole) of a dipole moment M, and curve around and return to the other end (i.e., the south pole) of dipole moment M. Consequently, in the presence of a nearly constant background field such as $B_E$, the $B_A$ field can, depending where the field values are measured, either add to or subtract from $B_E$. At distances, r, from the object that are greater than about three times the object's largest dimension, the $B_A$ fields are described by the well-known magnetic dipole field equation of classical electromagnetic theory. Consequently, the $B_A$ fields that are produced by magnetic objects generate rapidly-varying, anomalous changes (i.e., amplitudes are reduced by $1/r^3$) in the slowly varying earth's background field $B_E$.

As is well known in the art, the magnitude $B_E$ is generally much larger than $B_A$ (i.e., $B_E \gg B_A$) except for field points that are measured very close to the dipole source M of the magnetic object's anomaly field $B_A$. The earth's field and anomaly field vectors sum to create a total field $B_T = B_E + B_A$. The problem of using $B_A$ to detect and localize magnetic objects, then, requires methods and apparatus than can detect and discriminate relatively small target signatures $B_A$ that are convolved with the relatively very large (yet also fairly constant) earth field $B_E$.

There are, broadly speaking, two separate approaches to magnetic anomaly localization. One approach involves measurement of changes in the scalar field $B_T$ and the other approach involves measurement of changes in the vector (and/or tensor) components of $B_T$. Both approaches have their advantages and limitations.

The scalar total field approach typically involves the use of magnetic field sensors or magnetometers (e.g., proton precession magnetometers, atomic vapor magnetometers, etc.) that detect and measure the scalar magnitude of the total field $B_T$. An important advantage of this approach is the fact that true scalar quantities are "rotationally invariant", that is, they do not change when the sensor coordinate system rotates. Therefore, scalar magnetometers are often used for mobile applications where the sensor platform can undergo large changes in orientation angle. However, total field magnetometers that can only respond to $B_T$ essentially only measure the components of $B_A$ that are parallel to $B_E$ (i.e., the scalar projection of $B_A$ on $B_E$) and therefore cannot provide a complete set of the target localization information that is implicit in $B_A$. In particular, although $B_T$ and the embedded anomaly field $B_A$ are rotational invariants, they are not by themselves "robust" quantities that allow efficient localization of magnetic anomalies. As used herein, the term "robust" will be applied to mathematical quantities or signals that always increase as a sensor approaches a target and always decrease as the sensor-target distance increases.

In essence then, true scalar magnetometers do develop rotationally invariant total field signals that contain some target signature information. However, the inherently limited target localization and classification capabilities of scalar total field data require inefficient use of platform mobility resources when trying to find magnetic objects. Specifically, in order to localize magnetic targets, scalar total field magnetometer based sensor systems must make many passes over the target area. Furthermore, unless some form of actual contact with the target is made, there will be ambiguities as to actual target position and size.

The vector approach to magnetic anomaly detection and localization is based on magnetic field sensors (e.g., fluxgates, SQUIDs, magnetoresistive devices and Hall effect devices) with field sensing elements whose output voltages represent the direction and magnitude of field vector along the elements' sensitive axes. For example, a set of three vector sensors can be configured to form a "triaxial" sensor that has three mutually perpendicular field sensing axes that intersect at a single point so that they form a local orthogonal coordinate system at the local position of the triaxial sensor. In principle, since a set of three non-coplanar vector magnetometers can completely determine the three dimensional field components of $B_A$, the vector magnetometer approach has the advantage that none of the anomaly field's implicit target localization information is lost. However, any measurement of magnetic anomaly vector components also necessarily includes the much larger in magnitude vector components of the earth's field $B_E$. Consequently, vector magnetometers actually measure the components of the total field $B_T = B_E + B_A$ along the sensors' axes of sensitivity so that sensors' outputs contain $B_{Tx}$, $B_{Ty}$, $B_{Tz}$, where $B_{Tx} = B_{Ex} + B_{Ax}$, etc. The magnitude and direction of the measured components very strongly depend on the sensor system's orientation in the earth's field.

Depending on sensor orientation, the component of the earth's field $B_E$ along any given sensor axis can vary between ±50,000 nT. Also, depending on sensor axis orientation, the angular rate of change in measured field component with changes in sensor angular orientation can vary between 0 to ±900 nT/degree. Thus, mobile applications for vector magnetometers are severely limited by the fact that changes in orientation of the measuring sensor can produce non-target related changes in the measured vector components and overwhelm the nT-level and sub-nT-level target signals. For these reasons, the use of vector magnetometers is usually limited to applications where the sensors do not move or where motion of the sensor platform is restricted to straight line tracks. However, such restrictions on sensor motion greatly restrict the range of practical applications for mobile vector sensors.

For mobile applications, triaxial vector sensors can be operated in a total field mode that creates a rotationally invariant scalar total field quantity from measurements of three orthogonal field components ($B_{Tx}$, $B_{Ty}$, $B_{Tz}$) in the sensor's coordinate system. The rotationally invariant total scalar field is obtained by mathematically combining the field quantities in the expression $$B_T = (B_{Tx}^2 + B_{Ty}^2 + B_{Tz}^2)^{0.5}$$

However, as discussed above, $B_T$ is not a very robust quantity and deviations of the sensor axes from perfect orthogonality can again produce non-target related changes in the measured $B_T$ that overwhelm small target signals. Still, if the sensor motion errors somehow can be eliminated or greatly reduced, $B_T$ can provide very useful indications of the presence of a target somewhere in the detection space of the sensor.

In summary, the vector magnetometer approach has an advantage over the scalar approach in that vector measurements in principle can provide a method for sensitive target detection and accurate localization. However, in practice, the major limitation of the conventional vector magnetometer approach for magnetic target detection and localization from mobile sensor platforms is that the very small $B_A$ signals must be discriminated from the larger background $B_E$ field.

In order to apply the inherent localization capabilities of vector field sensors to mobile anomaly sensing applications, it is generally necessary to use the sensors in hardware and/or software configurations that essentially only measure the difference in field values between spatially separated points. Then, the gradient components of the magnetic anomaly field are equal to the difference in the field values $\Delta B$ divided by the separation distance measured along the line joining the measurement points. Compared to the direct $B_A$ vector field sensing method, use of the gradient of $B_A$, or $\nabla B_A$, can result in a reduction of detection range. This is because the amplitudes of the gradient signals are proportional to $1/r^4$ while the direct $B_A$ field components are proportional to $1/r^3$ where "r" is the distance between the sensor and the magnetic object. Even so, the gradient approach is attractive because it is, in principle, relatively insensitive to sensor rotations in the earth's field because the earth's field gradient is very small.

In practice, however, due to imperfections in their construction and alignment, gradiometers are subject to sensor orientation dependent imbalance errors. Similar to the case of vector magnetometers, the rotation of gradiometer sensors in the earth's B-field causes non-target related changes in the matrix elements of the gradient tensor and, consequently, sensor rotation-induced degradation of the gradiometer's detection range. Even in perfectly balanced gradiometers, rotations of the sensor platform will produce changes in the tensor's matrix elements that can cause the system to lose the magnetic target because of computational complexities brought about by a moving coordinate system.

Owing to errors produced by sensor platform motion, the conventional use of gradiometers for sensing magnetic dipole targets onboard mobile platforms is limited to applications where the sensor system can be moved at constant velocity on a straight line track, with essentially no changes in sensor platform orientation. In addition, the conventional gradient tensor technique involves significant computational overhead that, together with the need to avoid large changes in sensor orientation, impede the practical adaptation of the technique to highly mobile systems such as autonomous robotic vehicles involved in pseudo random search patterns for buried mines.

SUMMARY OF THE INVENTION

Accordingly, it is an object of the present invention to provide a magnetic anomaly sensing system.

Another object of the present invention is to provide a magnetic anomaly sensing system that is unaffected by random sensor movement.

Still another object of the present invention is to provide a magnetic anomaly sensing system that performs well on highly maneuverable platforms.

Yet another object of the present invention is to provide a magnetic anomaly sensing system that can robustly detect magnetic anomalies in underwater environments.

A still further object of the present invention is to provide a magnetic anomaly sensing system that operates on passive sensing principles.

Another object of the present invention is to provide a magnetic anomaly sensing system that can be used to detect and locate underwater objects having a magnetic signature.

Other objects and advantages of the present invention will become more obvious hereinafter in the specification and drawings.

In accordance with the present invention, a system and method for sensing magnetic anomalies is provided. A support that is electrically non-conductive and non-magnetic has at least one pair of triaxial magnetometer-accelerometer (TMA) sensors coupled thereto. Each pair of TMA sensors is separated by a known distance. Each TMA sensor has X, Y, Z magnetic sensing axes and X, Y, Z acceleration sensing axes that are, for computational convenience, parallel to one another and to the X, Y, Z magnetic sensing and acceleration axes of all others of the TMA sensors. Each TMA sensor outputs X, Y, Z components ($B_x$, $B_y$, $B_z$) of local magnetic fields and X, Y, Z components ($A_x$, $A_y$, $A_z$) of local gravitational acceleration fields. The X, Y, Z components ($B_x$, $B_y$, $B_z$) and ($A_x$, $A_y$, $A_z$) output from each TMA sensor are processed to generate motion-compensated X, Y, Z components ($B_{cx}$, $B_{cy}$, $B_{cz}$) of local magnetic fields. A difference is generated between the motion-compensated X, Y, Z components ($B_{cx}$, $C_{cy}$, $B_{cz}$) for each pair of TMA sensors thereby generating differential vector field components ($\Delta B_x$, $\Delta B_y$, $\Delta B_z$). For improved accuracy, the differential vector field components ($\Delta B_x$, $\Delta B_y$, $\Delta B_z$) can be adjusted using the X, Y, Z components ($A_x$, $A_y$, $A_z$) of local gravitational acceleration fields and the motion-compensated (X, Y, Z) components ($B_{cx}$, $B_{cy}$, $B_{cz}$) of local magnetic fields in order to compensate for motion of the support. Gradient components $G_{ij}$ are generated using the differential vector field components ($\Delta B_x$, $\Delta B_y$, $\Delta B_z$) where i={x, y, z} and j={x, y, z}. In general, for each of the X, Y, Z magnetic sensing axes, the gradient components $G_{ij}$ are defined by ($\Delta B_x/\Delta_j$, $\Delta B_y/_{66\ j}$, $\Delta B_z/\Delta_j$), wherein $\Delta_j$ is a distance between the pair of TMA sensors relative to a j-th one of the X, Y, Z magnetic sensing axes. A scalar-quantity gradient contraction defined as $$C^2 = \sum_{i,j} (G_{ij})^2$$

is generated for each pair of TMA sensors. The gradient contraction $C^2$ is a robust, rotationally-invariant quantity that changes monotonically with proximity to a magnetic target.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
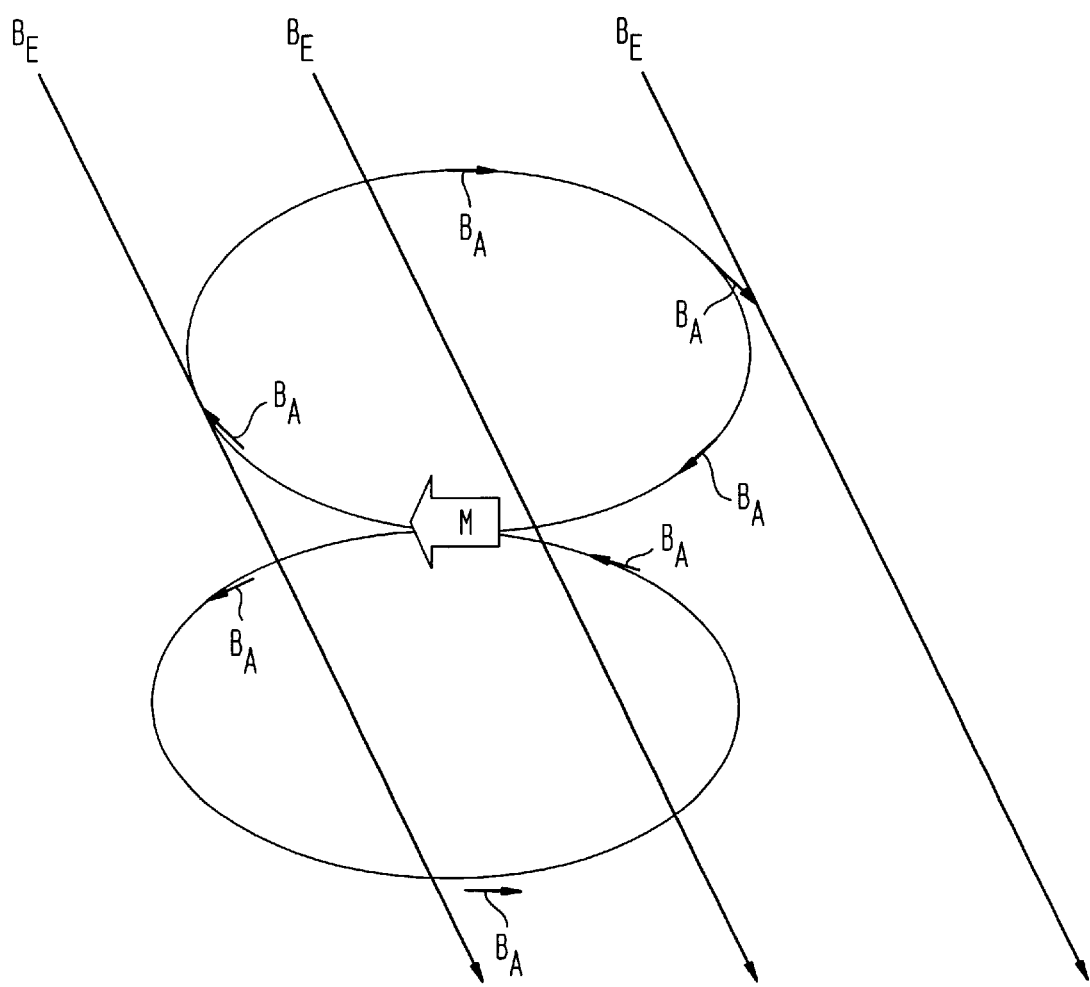
FIG. 1 is a is a schematic view of the magnetic induction lines of force generated by a magnetized object relative the earth's magnetic induction field.
Figure 2:
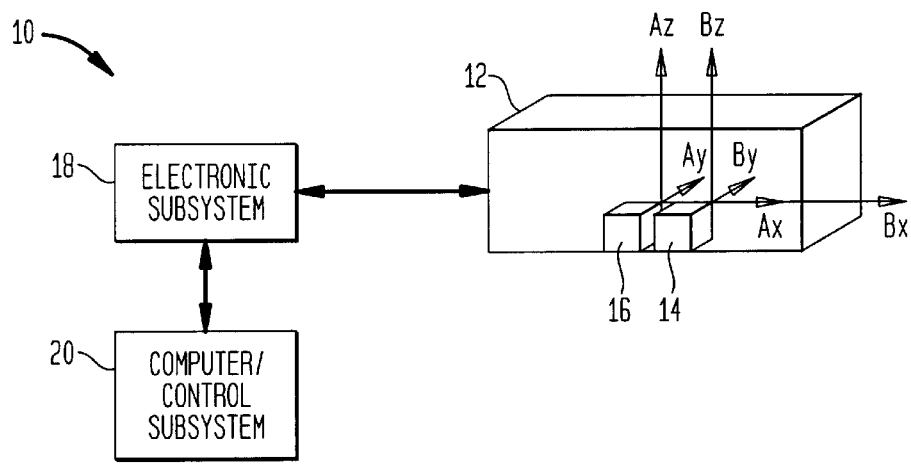
FIG. 2 is a schematic diagram of a triaxial magnetometer-accelerometer used in the present invention.

Referring now to FIG. 2, the essential construction features of a field point sensing element 10 are shown. Sensing element 10 constitutes the basic construction element for development of the present invention's unique magnetic anomaly sensing system embodiments. While the present invention's design is particularly useful as a magnetic anomaly sensing system for use on small robotic platforms, the physical design principles and application of mathematical methods described herein are generally adaptable for any low frequency passive magnetic anomaly sensing application.

As shown in FIG. 2, field point sensing element 10 is composed of spatially correlated sets of triaxial vector magnetometers and triaxial accelerometers. This arrangement allows the development of more accurate measurements of magnetic field components by removal of motion and orientation dependent output signal errors. The errors in the magnetometers' magnetic field measurements are removed both by applying pre-calibrated magnetometer error correlation functions and by tracking sensor orientation using the signals from the spatially correlated triaxial accelerometers and applying error compensation correction factors.

In order for this method of motion error compensation to work, each field point sensing element 10 has an individual magnetometer/accelerometer unit 12 that combines, in close physical proximity, a triaxial vector magnetometer set 14 having three mutually orthogonal magnetic field sensing axes ($B_x$, $B_y$, $B_z$) and a triaxial vector accelerometer set 16 having three orthogonal sensing axes ($A_x$, $A_y$, $A_z$) in corresponding parallel alignment to the magnetic field sensing axes, i.e., $B_X$ is parallel to $A_X$, etc. The sense axis directions define a convenient and computationally efficient choice for a local (X, Y, Z) coordinate system.

The outputs of magnetometer set 14 and accelerometer set 16 are provided to an electronics subsystem 18 providing data acquisition functions, signal processing functions such as motion error compensation, and interface functions for a computer/control subsystem 20. Functions provided by computer/control subsystem 20 can include hardware/software for data acquisition and signal processing functions for the present invention's magnetic target detection/localization scheme. In the case where sensing element 10 is onboard a robotic vehicle, subsystem 20 could also provide outputs for the robotic vehicle's controller (not shown).

The design and construction requirements that the individual components (e.g., magnetometer set 14 and accelerometer set 16) and subsystems 18 and 20 must meet in order for this invention to provide robust target localization from arbitrarily moving platforms will now be described. The individual magnetometers (not shown) making up set 14 must meet the following criteria:

Provide a signal output that responds to the vector component of magnetic field along a single direction in space (i.e., the sensitive axis) and not respond to field components that are orthogonal to the sensitive axis.

Have a frequency response from DC to frequencies high enough to include the entire motion-induced frequency spectrum contained in a target's induction field $B_A$.

Have sufficient sensitivity and dynamic range to effectively detect and discriminate small anomaly fields $B_A$ in the large background field $B_E$ of the earth.

Be of small physical size to allow a triad of sensors to be mutually configured in very close proximity as a triaxial array with orthogonal sense axes.

Be easily and accurately compensated for the individual differences between the sensor channels' gain and alignment in the sensor system reference frame.

Present day vector magnetometer technology and recent advances in micro-electromechanical systems (MEMS) technology allows these criteria to be fulfilled by a variety of sense elements such as fluxgates, giant magnetoresistive devices, superconducting quantum interference (SQUID) devices and enhanced sensitivity Hall effect devices.

The particular criteria that the individual accelerometers (not shown) making up set 16 must meet are as follows:

Provide a signal output that responds to the vector component of acceleration along a single direction in space (i.e., the sensitive axis) and not respond to acceleration components that are orthogonal to the sensitive axis.

Have a response from DC to the highest frequencies that are induced by platform motion. A fast response time provides an essentially instantaneous reading of sensor and sensor platform kinematics.

Have a wide dynamic range to be able to measure small accelerations in the earth's gravity field g.

Provide high repeatability to provide for effective elimination of sensor orientation dependent errors.

Be of small physical size and magnetic moment that allow the sensors to be configured into orthogonal triaxial array in very close proximity to triaxial vector magnetometer set 14.

Once again, present day solid state accelerometer technology allow these criteria to be fulfilled by capacitive type solid state accelerometers and/or advanced micro-electromechanical systems (MEMS)-based accelerometer technologies.

The criteria for each TMA sensor unit 12 are as follows:

Maintain triaxial vector magnetometer set 14 and triaxial vector accelerometer set 16 in close proximity so that the measured acceleration correlates as closely as possible with the measured field at a point in space.

Provide precise physical (and/or electronic) alignment of the accelerometers and magnetometers such that their vector sensing axes are mutually parallel so that each measured acceleration component correlates as closely as possible with the respective measured field component.

Provide capability for essentially simultaneous measurement of vector field and acceleration signals so that there is negligible uncompensated motion error due to time skew between field and acceleration measurements.

Provide adequate measurement update rate to effective real-time compensation of sensor rotational errors so that there is negligible uncompensated motion error due to time skew between field and acceleration measurements.

Provide accurate tables of TMA sensor orthogonality and calibration errors as a function of angular orientation in the earth's unperturbed $B_E$ and $g_E$ fields in order to provide a database for real-time compensation of motion-induced sensor errors.

While a variety of constructions for field point sensing element 10 are possible, one commercially-available unit is an orientation sensor available from Applied Physics Systems, Mountain View, Calif. More specifically, in tests of the present invention, a "Model 544" miniature angular orientation sensor was used for element 10. The Model 544 uses triaxial fluxgate-type magnetic field sensing elements for measuring magnetic components and triaxial capacitive-type accelerometer sensing elements for measuring acceleration components. However, any field point sensing elements that combine the essential features of sensitive, non-interfering, triaxial B and A sensing elements mounted together in close proximity with parallel sensing axes could be used.

Prototype magnetometer/gradiometer sensing system configurations in accordance with the present invention used the Model 544 to develop motion compensated field and gradient signals for localization of magnetic targets. Angular orientation information is measured with respect to the earth's magnetic field $B_E$ and gravitational field $g_E$. Note the Model 544 devices may not be appropriately sensitive or accurate for many magnetic anomaly sensing is applications, and lack desirable features such as rapid updating of signal outputs. However, the Model 544 was easily adapted into a prototype magnetic anomaly sensing system for demonstration of proof of principle of this invention. In particular, the Model 544 sensors advantageously combine triaxial magnetometer/accelerometer sensing elements and internal electronics circuitry to provide motion compensation for each field point sensing element.

Specifically, the Model 544 has the following characteristics:

Each orientation sensor consists of a small rectangular package containing three orthogonal fluxgate magnetometers, a triaxial accelerometer, signal conditioning electronics, a 16-bit A/D converter, a microprocessor and internal program that calculates sensor orientation from measurements of magnetic field and acceleration, internal memory with field calibration and correction factors, and a RS-232 type serial data interface.

Each magnetometer has a sensitivity at 1 Hz of 0.2 $nT/Hz^{0.5}$, and the resolution of its digitized B-field output is 1 nT. The accelerometer's frequency response is from 0–35 Hz and the resolution of its digitized output is $10^{-4}$ g. Sensor axes are orthogonal to within 0.2° thereby implying a maximum uncompensated orthogonality error of ≈175 nT, and the axes are aligned to within 0.2° of the sensor package reference frame.

The sensors are capable of two way communication with PC-type computers using the RS-232 interface bus. Each sensor can be commanded under computer control over the RS-232 interface to output either orthogonal components of B and g, total B-field, total g, or heading, pitch, and roll angles with respect to magnetic north, the earth's $g_E$-vector, and/or the earth's $B_E$-vector.

Figure 3:
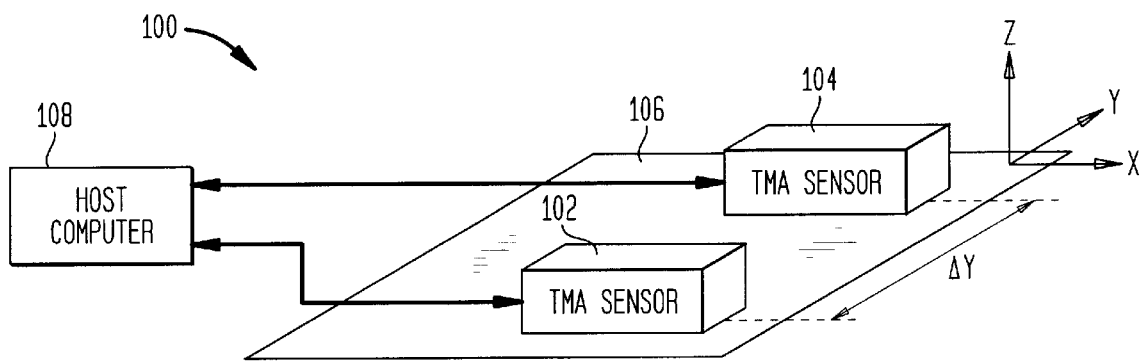
FIG. 3 is a schematic diagram of a single-axis or linear magnetic anomaly sensing system according to the present invention.

A single-axis or linear magnetic anomaly sensing system based on the above-described TMA sensor unit 10 is shown in FIG. 3 and referenced generally by numeral 100. Sensing system 100 provides proof of principle of the capability of the present invention's use of rotationally invariant scalars for magnetic target detection and localization. The limited number of gradient matrix element or "channel" measurements that the single-axis sensor can produce does not provide complete target localization and moment information. However, as will be explained further below, the single-axis system does provide rotationally invariant and robust target proximity dependent signals. Consequently, the single-axis system provides a basis for development of magnetic proximity sensing systems with many unique high mobility applications, e.g., a robust guidance system for guiding a mobile system toward a magnetic target, a ferrous metal detector for divers, etc.

With reference to FIG. 3, two TMA sensors 102 and 104 are mounted on a rigid non-magnetic and electrically non-conductive (e.g., non-metallic) platform 106 with their respective X, Y, Z sensing axes parallel to one another. For this example, it is assumed that each of TMA sensors 102 and 104 is configured as TMA sensor 10. That is, the related electronic and computer/control subsystems are integrated with each of TMA sensors 102 and 104 (as is the case with the Model 544 sensor). However, it is to be understood that the electronics and computer/control could also be provided by systems external to the TMA sensor "package" without departing from the scope of the present invention. For clarity of illustration, the related electronic and computer/control subsystems for each of TMA sensors 102 and 104 have been omitted from FIG. 3.

The set of X, Y, Z coordinate axes for platform 106 is chosen to be parallel with the measurement axes of TMA sensors 102 and 104 where +X represents the direction of forward platform motion. TMA sensors 102 and 104 are mounted with their Y-axes collinear and separated a distance ΔY on the sensor platform. The appropriate distance for ΔY is determined by application-specific sensor sensitivity and operational requirements, and can range from a few centimeters to several meters. TMA sensors 102 and 104 are further positioned such that ΔX=ΔZ=0. As is the case for all gradiometer systems, gradiometer balance depends critically on the accuracy to which the field sensing elements of TMA sensors 102 and 104 are aligned.

Figure 4:
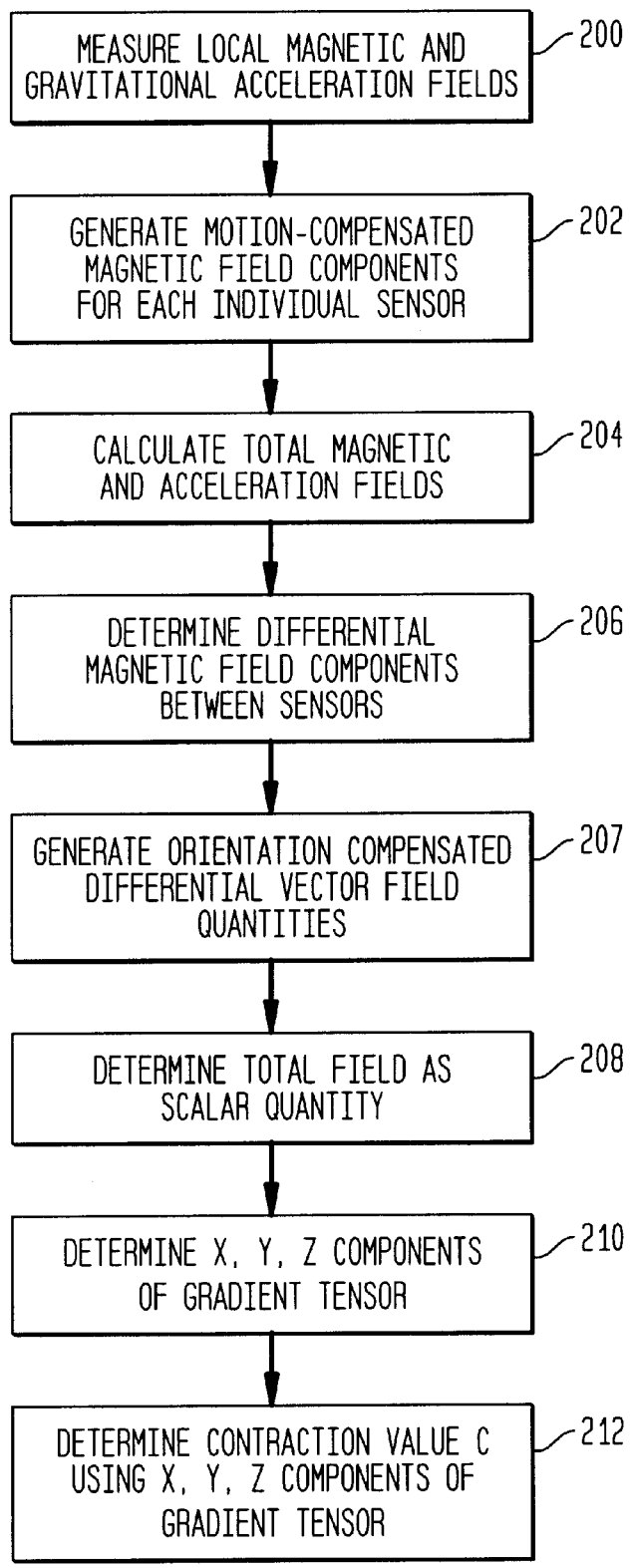
FIG. 4 is a flow diagram depicting the operational steps at a single measurement location for the linear magnetic anomaly sensing system.

With additional reference now to the flow diagram depicted in FIG. 4, operation of sensing system 100 at a single measurement location will now be described. At block 200, each TMA sensor 102 and 104 individually measures the X, Y, Z components of the local magnetic field ($B_x$, $B_y$, $B_z$) and gravitational acceleration field ($A_x$, $A_y$, $A_z$) in the reference frame of the sensor. At block 202, each TMA sensor's onboard (or external) electronics and computer/control subsystems perform signal conditioning, analog-to-digital conversion and internal correction for measurement errors due to orientation-dependent orthogonality and alignment errors. For the Model 544 type TMA, orientation compensation for the magnetometers and orientation compensation for the accelerometers are separate and independent processes that are based on separate and independent calibrations. The calibration data is used independently to compute corrections for orthogonality and scaling errors. The TMAs determine their orientation in the Earth frame by measuring, in the sensor frame, XYZ components of earth's gravity $g_E$ and earth's magnetic field $B_E$ and using the components in simple trigonometric calculations to determine the sensor's magnetic heading, pitch and roll in the Earth frame. Note that the measurements of $g_E$ are only valid when the TMA is at rest or undergoing relatively small accelerations. Therefore the determination of heading, pitch and roll are most accurate when the sensor system is not undergoing accelerated motion.

As a result, each of TMA sensors 102 and 104 can be used to provide local motion-compensated magnetic field components designated herein as ($B_{cx}$, $B_{cy}$, $B_{cz}$). The motion-compensated magnetic field components ($B_{cx}$, $B_{cy}$, $B_{cz}$) correlate sensor and platform motion (measured by accelerometer set 16) with motion-induced errors in the magnetic field measurements at each TMA. The motion-compensated magnetic field components and acceleration components from each of sensors 102 and 104 are provided to a host computer 108 for further processing. Such processing should include i) determination of individual TMA orientation, e.g., heading, pitch and roll, using the motion-compensated magnetic field components and acceleration components in straight-forward trigonometric calculations, and ii) application of the orientation information to provide additional motion error compensation for the (gradiometer) combination of TMA sensors 102 and 104 as will be explained further below.

The motion-compensated magnetic field components ($B_{cx}$, $B_{cy}$, $B_{cz}$) are used to calculate scalar-quantity total fields $B_T$ and $A_T$ at block 204 for each of TMA sensors 102 and 104 as follows:

$$B_T = [(B_{cx})^2 + (B_{cy})^2 + (B_{cz})^2]^{0.5} \quad (1)$$

$$A_T = [(A_x)^2 + (A_y)^2 + (A_z)^2]^{0.5} \quad (2)$$

Note that these quantities can be determined internally by a Model 544 sensor. However, other sensor configurations may require such processing to be handled by, for example, host computer 108. In addition, even though the total field values are based on corrected field component values, additional iterative corrections should be made for any residual errors left over from the individual TMA's correction as well as possible errors that result from the gradiometer configuration. Sums of $B_T$ values from different TMAs provide pseudo robust signals for target localization and $A_T$ values provide information regarding the effectiveness of motion compensation. Therefore, the $B_T$ and $A_T$ values should be corrected to eliminate any residual variations of these values as a function of the gradiometer orientation.

Additional quantities/values determined at each measurement location include:

At step 206, determination of the X, Y, Z components of the differential vector field between sensors 102 and 104 or $$\Delta B_x = (B_{cx})_{104} - (B_{cx})_{102} \quad (3)$$

$$\Delta B_y = (B_{cy})_{104} - (B_{cy})_{102} \quad (4)$$

$$\Delta B_z = (B_{cz})_{104} - (B_{cz})_{102} \quad (5)$$

where the subscripts "102" and "104" designate the particular TMA sensor.

At step 207, determination of orientation compensation of the gradiometer combination of TMA sensors 102 and 104. As mentioned above, orientation compensation of the gradiometer involves adjusting the differential vector field quantities $\Delta B_x$, $\Delta B_y$, $\Delta B_z$ using the TMAs' orientation information (e.g., heading, pitch and roll) to determine orientation compensated differential vector field quantities $\Delta B_{cx}$, $\Delta B_{cy}$, $\Delta B_{cz}$. Again, the heading, pitch and roll are derived from the X, Y, Z components $(A_x, A_y, A_z)$ of local gravitational acceleration components and the motion-compensated X, Y, Z components of local magnetic fields $(B_{cx}, B_{cy}, B_{cz})$. It is to be understood that the remainder of the process can utilize the-non-adjusted differential vector field quantities $\Delta B_x$, $\Delta B_y$, $\Delta B_z$ for a lesser degree of accuracy, or the compensated differential vector field quantities $\Delta B_{cx}$, $\Delta B_{cy}$, $\Delta B_{cz}$ for a greater degree of accuracy. Accordingly, although the remainder of the equations recited herein will refer only to the non-adjusted differential vector field quantities $\Delta B_x$, $\Delta B_y$, $\Delta B_z$, it is to be understood that the same mathematical manipulations could be used with the compensated differential vector field quantities $\Delta B_{cx}$, $\Delta B_{cy}$, $\Delta B_{cz}$. Note that although step 207 is an optional step, it is one that would typically be performed for best accuracy.

At step 208, determination of the sum of scalar total field information or $$(B_T)_{SUM} = (B_T)_{102} + (B_T)_{104} \tag{6}$$

At step 210, determination of the X, Y, Z components of the gradient tensor in the sensor frame which, for the illustrated example, is a partial gradient tensor since $\Delta X = \Delta Z = 0$ for sensing system 100. Thus, the partial gradient tensor measured in the X, Y, Z frame of sensing system 100 is $(\Delta B_x/\Delta Y, \Delta B_y/\Delta B_z/\Delta Y)$.

At step 212, a scalar gradient contraction operation is performed to determine a scalar-quantity gradient contraction derived C-value where C is the positive square root of the gradient contraction in Cartesian coordinates herein defined as $$C^2 = \sum_{i,j} (G_{i,j})^2 \tag{7}$$

where $G_{ij}$ represents components of the magnetic dipole field gradient tensor matrix, $i=\{x, y, z\}$ and $j=\{x, y, z\}$. In the general three dimensional case, $G_{ij}$ represents a 3 by 3 matrix array of nine gradient components of which only five components are independent. For the illustrated example where $\Delta X = \Delta Z = 0$, only three independent components can be measured in the sensor frame and the partial gradient matrix reduces to $$G_{ij} = (\Delta B_x/\Delta Y, \Delta B_y/\Delta Y, \Delta B_z/\Delta Y) \tag{8}$$

The acceleration measurements can be used to develop a database of factors used to eliminate orientation-dependent orthogonality errors and imbalance errors experienced by the system's gradiometer, i.e., the combination of sensors 102 and 104 on platform 106. For the general case where TMA units other than the Model 544 are used, the individual TMA units and the overall multi TMA gradiometer assembly must be calibrated to ensure that magnetic measurement accuracy is maintained when the sensor's motion causes it to change orientation in the earth's $B_E$ field. Each TMA's triaxial accelerometers and triaxial magnetometers must be calibrated prior to sensor system use. Then, unlike the case for more conventional vector magnetometer designs, when the TMAs are incorporated into a gradiometer system, the magnetic measurements at each point of the gradiometer will be substantially free from orientation-dependent errors due to orthogonality errors and scaling errors. A calibration should also be performed for the overall gradiometer system in order to account for orientation dependent gradiometer imbalance errors and to iteratively correct for any residual TMA errors that may remain in the TMA units after the first calibration. While these calibrations would be understood by one of ordinary skill in the art, a brief description thereof is included herein.

For brevity, the individual TMA accelerometer and magnetometer component calibrations are described together with the gradiometric TMA assembly calibrations. However, calibration can be performed separately for the different sensors. The steps are as follows:

(1) Install individual TMA or multiple TMA sensor array in known angular positions within calibrated A field (i.e., $g_E$ for the static or slow motion cases) and/or B field sources. The A and B calibrations can be performed separately.

(2) For each position of an individual TMA sensor, measure correlated sets of XYZ components of B-field and A-field data, ie., $B_{X,Y,Z}$ and $A_{x,y,z}$. For a gradiometer configuration, include measurements of differential fields $\Delta B_{X,Y,Z}$, $\Delta B_T$, $\Delta A_{X,Y,Z}$, $\Delta A_T$, and/or total field $B_T$, $A_T$ values for each sensor axis with respective calibrated reference values of XYZ components of A field and B field.

(3) Correlate the measured data with known field values for each sensor orientation to determine orientation dependent errors.

(4) Develop a digital database of sensor scale factors, orientation dependent magnetic measurement errors and acceleration measurement errors versus true, calibrated values of magnetic field and acceleration components.

Note that motion compensation is most effective for relatively stable motion where relatively small kinematic acceleration components are defined by $A_T \approx 1$ gee and $\Delta A_{X,Y,Z} \approx 0$ gee. Consequently, the present invention uses $A_T$ and $\Delta A_{X,Y,Z}$ as "motion quality factors" that identify when orientation compensation is effective. Use of $A_T$ and $\Delta_{X,Y,Z}$ in this manner proceeds as follows:

(a) Prior to application of motion dependent orientation compensation described in steps (A) and (C) below, measure $A_T$ and $\Delta A_{X,Y,Z}$.

(b) Verify that $|A_T - 1| < \epsilon_T$ and $|\Delta_{X,Y,Z}| < \epsilon \epsilon_A$, i.e., that the sensor system rate of change of motion (or kinematic acceleration) is within predetermined limits $\epsilon_T$ and $\epsilon_A$ where appropriate values of $\epsilon_T$ and $\epsilon_A$ are determined in the sensor calibration process and depending on system accuracy requirements, vary from about 0.05 gee to approximately 0.5 gee.

(c) If any $|A_T - 1| > \epsilon_T$ and/or $|\Delta_{X,Y,Z}| > \epsilon_A$, either have the sensor system repeat steps (a) and (b) until $|A_T - 1| \epsilon_T$ and $|\Delta A_{X,Y,Z} < \epsilon_A$ before proceeding to the following orientation error compensation steps (A)–(C) below, or have the sensor system adaptively ascribe less weight to field measurement results, e.g., raise target detection threshold levels until motion has stabilized.

Motion dependent orientation compensation for a mobile gradiometer can be achieved (using the results from steps (1)–(4)) as follows:

(A) Apply orientation error corrections from step (4) above to individual TMA B-field components.

(B) Calculate total field total B-field sums $\Sigma B_T$ and differential field components $\Delta B_{X,Y,Z}$ for each gradiometer axis.

(C) Apply orientation error corrections to total B-field sums $\Sigma B_T$ and differential field components $\Delta B_{X,Y,Z}$ for each gradiometer axis.

Additional reduction of the effects of sensor motion is provided by the present invention's development and use of the gradient contraction which is the rotationally invariant mathematical quantity defined in equation (7). For the single-axis system being described, the present invention uses a partial contraction composed of three components of the gradient tensor measured in the sensor frame, namely $$C^2 = (\Delta B_x/\Delta Y)^2 + (\Delta B_y/\Delta Y)^2 + (\Delta B_y/\Delta Y)^2 \qquad (9)$$

which can be obtained in a single measurement data set taken at a single position of the sensor.

To verify that minimal errors are produced for all possible orientations of the sensor(s), an interpolative error calculation method can be used to subtract out orientation dependent measurement errors (from step (4) above) and calculate gradient contraction and total field values versus angular orientation. A digital database of orientation dependent gradient contraction errors versus sensor system magnetic heading, pitch and roll can then be developed and used to iteratively correct for residual errors that may remain from the TMA and gradiometer calibration processes.

In terms of sensing system 100, changes in total field values are indicative of the presence of the target. However, the magnitude and sign of the changes, while independent of the systems's platform angular orientation (to within the limits imposed by uncompensated imbalance and orthogonality errors), does depend on the gradiometer's position in space relative to the target. Thus, while the total field is rotationally invariant, it is not a robust quantity and is, therefore, not useful by itself as an efficient means for homing in on magnetic targets. However, by summing the total field values from two TMA sensors as in equation (6), a "pseudo robust" signal can be obtained wherein magnitude of the changes in the sum of total fields tends to increase as the sensing system approaches the target.

Thus, the rotationally invariant total field quantities $B_T$ and $\Sigma B_T$ of equations (1) and (6) can be used along with the more important gradient contraction $C^2$ for target localization using the invention. The main purpose for using these quantities is to enhance the detection and localization range of the sensor system. While $B_T$ is not robust, field test data for the two TMA lineal gradiometer indicate that for targets with mine-like magnetic signatures, the magnitude of the changes in $|\Sigma B_T|$ is "pseudo (or quasi) robust". That is, $\Sigma B_T$ tends to increase as the target is approached. This effect will be more pronounced in regions where the gradient of $B_T$ is relatively large since there can be significant differences between $B_T$ values measured by different TMA's.

For multiple TMA configurations described further below, variations in $\Sigma B_T$ should tend to become more robust as the number of TMAs increases because the effective averaging of $B_T$ values represented by $\Sigma B_T$ is taken over a larger region or volume of space. Consequently, the quantity $|\Sigma B_T|$ is more likely to contain components that increase as the target is approached. The variation of $\Sigma B_T$ with distance r to the target is $\Sigma B_T r^{-3}$, while the variation of the gradient contraction derived C-value with distance r to the target is $C r^{-4}$. Hence, measurement of $B_T$ can be used to detect targets at longer range than using the derived C-value alone. By taking the sum $\Sigma B_T$, a pseudo robust, rotationally invariant signal is developed. Changes in $\Sigma B_T$ can be used to guide the sensor system toward the most probable position of the target until the derived C-value is strong enough for the system to unambiguously "lock onto" the target.

More significantly, however, the present invention uses contractions of the partial gradient tensor components measured in the reference frame of the gradiometer (i.e., $(\Delta B_x/\Delta Y)^2 + (\Delta B_y/\Delta Y)^2 + (\Delta B_z/\Delta Y)^2$) to provide fully robust quantities. That is, the gradient contraction data is rotationally invariant, robust and, most notably, independent of the relative position of the system's gradiometer sensor arrangement with respect to the target. For all radial bearings to and from the target, the gradient contraction $C^2$ increases monotonically as the sensing system approaches the target.

The proximity sensing capabilities of sensing system 100 require its movement between measurement locations in order to determine whether the target is getting closer or farther away. However, measurements at a single location of sensing system 100 do not provide explicit "localization" (i.e., range and bearing) information on the target. Still, based on the results and implications of the field tests of the single-axis sensing system, innovative multi-axis magnetic anomaly sensing systems can be designed for a new method of magnetic target detection, localization and classification. The new method uses rotationally invariant scalars for target localization by scalar triangulation and ranging.

Figure 5:
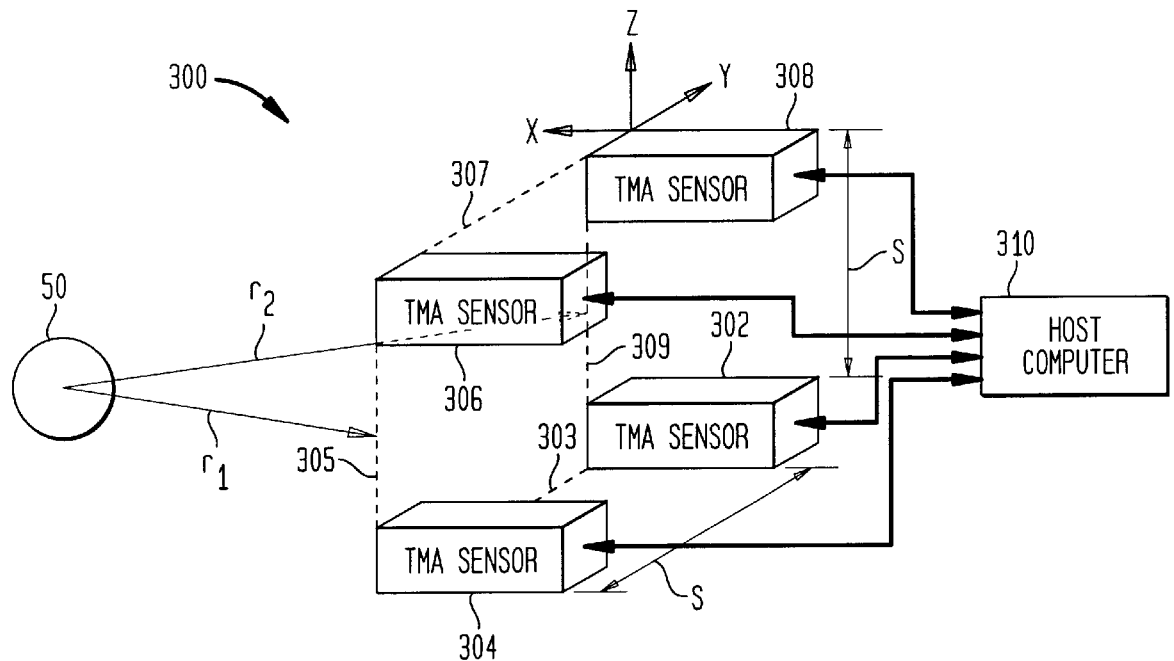
FIG. 5 is a schematic diagram of a multi-axis planar magnetic anomaly sensing system according to the present invention.

Referring now to FIG. 5, an example of a planar magnetic anomaly sensing system is shown and referenced generally by numeral 300. Sensing system 300 includes four TMA sensors 302, 304, 306 and 308, each of which is similar to TMA sensor 10. TMA sensors 302–308 are arranged at the four vertices of a planar square having sides of length S. However, other configurations (e.g. rectangles, triangles, trapezoids etc.), would function in a similar fashion. As in the single-axis design, magnetic and acceleration sense axes are parallel to one another with forward movement being in the +X direction. Further, TMA sensors 302, 304, 306 and 308 are supported in their square planar arrangement by a non-magnetic, electrically non-conductive support or frame which has been omitted for clarity of illustration. Each of the TMA sensors provides its "point sensed" magnetic and acceleration components to a host computer 310.

The arrangement of TMA sensors 302, 304, 306 and 308 essentially defines two pair of parallel single-axis sensing systems. Specifically sense axis 303 (between TMA sensors 302 and 304) is parallel to sense axis 307 (between TMA sensors 306 and 308), and sense axis 305 (between TMA sensors 304 and 306) is parallel to sense axis 309 (between TMA sensors 302 and 308). For computational convenience, processing to determine target range and bearing is generally carried out between parallel sense axes. By way of example, such processing will be explained for sense axes 305 and 309. In addition, comparative processing could be carried out for gradient axes that lie along the diagonals of the square arrangement of TMA sensors, i.e., a diagonal sense axis defined between TMA sensors 302 and 306 and a diagonal sense axis defined between TMA sensors 304 and 308.

Figure 6:
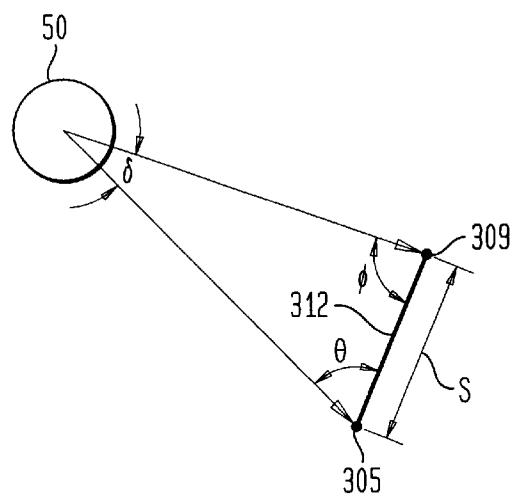
FIG. 6 is a diagrammatic view of the geometric relationships between two sense axes and a magnetic target for the planar magnetic anomaly sensing system in FIG. 5.

For the example to be described herein, a magnetic target 50 is located a distance $r_1$ from sense axis 305 and a distance $r_2$ from sense axis 309. This geometric relationship in the X-Y plane is illustrated in FIG. 6 where the angle between $r_1$ and $r_2$ is designated $\delta$; the angle between $r_1$ and an imaginary line 312 of length S between sense axes 305 and 309 is designated $\theta$; and the angle between $r_2$ and line 312 is designated $\phi$. The present invention uses scalar-quantity gradient contraction data to find the values of $r_1$ and $r_2$ in order to determine range and bearing to target 50.

The scalar triangulation method of the present invention is based on the robust behavior of the gradient contraction derived C-value. The following relations apply to the gradient contraction derived C-values $C_{305}$ and $C_{309}$ associated with sense axes 305 and 309, respectively, with respect to target 50 having an effective dipole moment M' having units of $Tm^3$. The relationships defining $C_{305}$ and $C_{309}$ are $$C_{305} = M'/r_1^4 \quad (10)$$

$$C_{309} = M'/r_2^4 \quad (11)$$

$$r_2/r_1 = (C_{305}/C_{309})^{0.25} \quad (12)$$

In other words, the ratio of scalar distances from each sensor axis to the target is equal to the fourth root of the ratio of the C-values determined at each sense axis. These quantities can be used in combination with the distance between sense axes 305 and 309 (i.e., the side length S), angles $\delta$, $\phi$, $\theta$, and well-known geometric and trigonometric relations to determine range and bearing to target 50.

Figure 7:
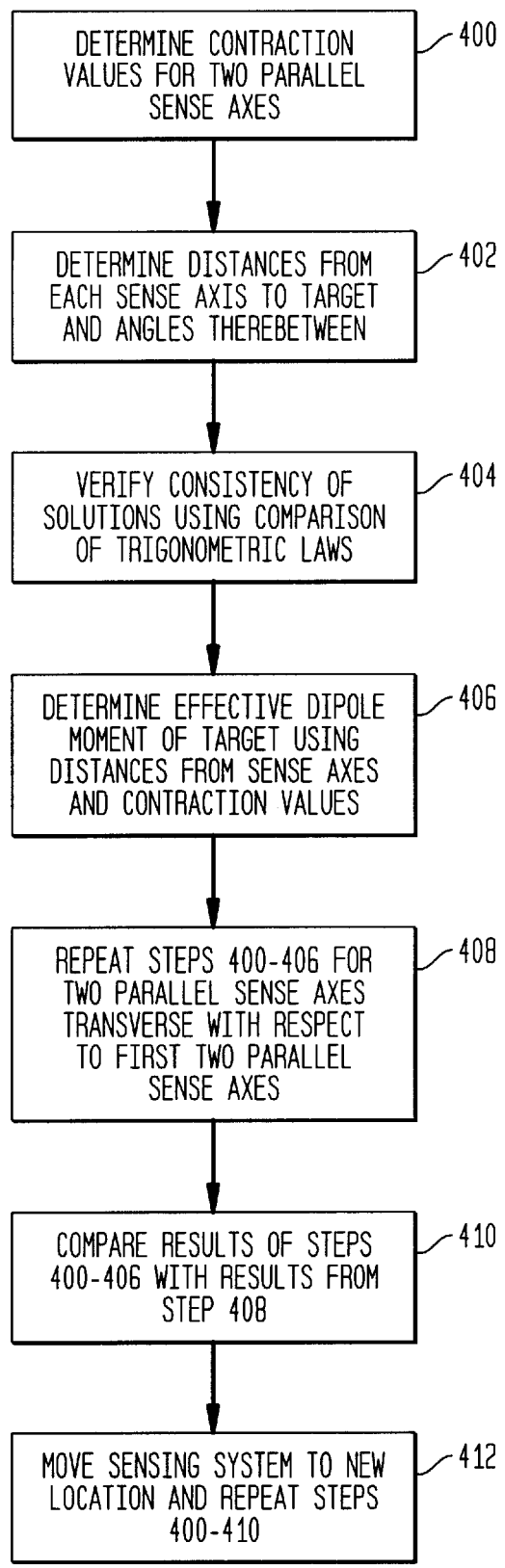
FIG. 7 is a flow diagram depicting the operation steps for the planar magnetic anomaly sensing system.

Referring additionally to FIG. 7, a flow diagram is shown depicting the operation of sensing system 300. At step 400, each of the derived C-values $C_{305}$ and $C_{309}$ are determined in the same fashion as described above for the single-axis sensing system. At step 402, the distances $r_1$ and $r_2$ and angles $\delta$, $\theta$ and $\phi$, are determined using C-values $C_{305}$ and $C_{309}$. Specifically, the trigonometric Law of Cosines and the relationship in equation (12) are manipulated to yield the following expressions for the angles depicted in FIG. 6.

$$\theta = \cos^{-1}[(r_1(C_{309}/C_{305})^{0.25})^2 + S^2 - r_1^2]/[2(r_1(C_{309}/(C_{305})^{0.25})S] \quad (13)$$

$$\phi = \cos^{-1}[r_1^2 + S^2 - (r_1(C_{309}/C_{305})^{0.25})^2]/2r_1S \quad (14)$$

$$\delta = \cos^{-1}[(r_1(C_{309}/C_{305})^{0.25})^2 + r_1^2 - S^2]/[2(r_1(C_{309}/C_{305})^{0.25})r_1] \quad (15)$$

Combining the above with the geometric relationship $\delta + \phi + \theta = \pi$(radians) = 180°, the equations are rewritten to solve for $r_1$, and then using equation (12), solved for $r_2$. The results for $r_1$ and $r_2$ are then substituted back into equations (13)–(15) to solve for the various angles. The angle values then can be used to determine the components of $r_1$ and $r_2$ in the Y-direction of the sensor frame.

If desired, the consistency of the solutions can be checked at step 404. Specifically, the determined values for $r_1$, $r_2$, $\delta$, $\theta$ and $\phi$ can be applied using the Law of Sines and Law of Cosines. The results can then be compared.

The effective dipole moment M' of target 50 is determined at step 406 using the determined C-values of $C_{305}$ and $C_{309}$, $r_1$ and $r_2$ in equations (10) and (11). At this point, performance of the above-described steps actually provides a circular locus of points. Target 50 is located somewhere on the circular locus. In order to obtain a better determination of target location, another set of solutions is required. Therefore, for planar sensing system 300, steps 400–406 should be repeated for the transverse sense axes or sense axes 303 and 307 as indicated at step 408. The respective angle values that are determined for the transverse axes can be used to determine the Z-components of the relative bearing vector to the target.

At step 410, the transverse axes solutions from step 408 are compared with solutions from sense axes 305 and 309. Target 50 is located at one of the two possible intersections of the two sets of solutions. The true target location is determined at step 412 by moving (in rotation and translation) sensing system 300 toward one of the apparent target positions to a new measurement location, and repeating steps 400–410 at that new measurement location. If gradient contraction values increase, the sensing system moved towards target 50. However, if the C-values decrease, the true target position is in the opposite direction and the sensing system's direction of motion should be reversed.

Figure 8:
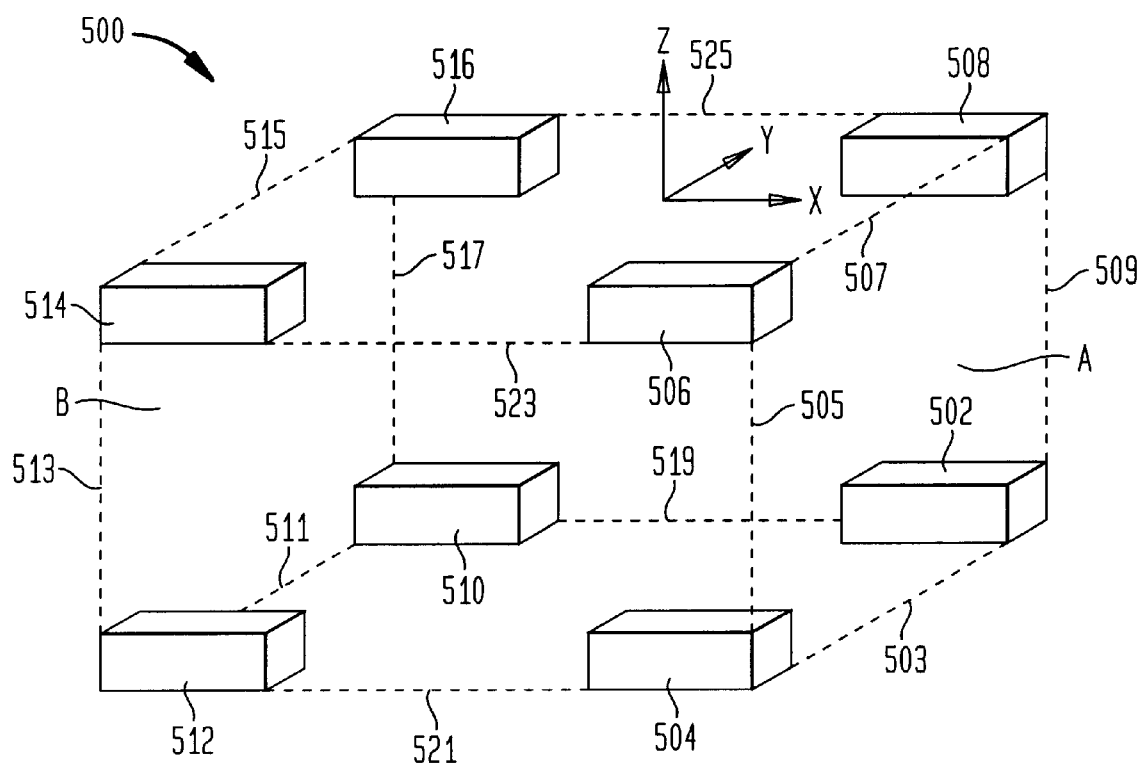
FIG. 8 is a schematic diagram of a multi-planar magnetic anomaly sensing system according to the present invention.

Similar to sensing system 100, sensing system 300 must be moved between two measurement locations to determine true target location. In order for a completely unique determination of true target location to be achieved by the present invention's scalar triangulation and ranging from a single position of the sensing system, a three-dimensional sensor configuration should be used. FIG. 8 depicts a design for a three-dimensional magnetic anomaly sensing system 500 composed of eight TMA sensors arranged in a configuration that eliminates ambiguities with regard to target position. The entirety of the sensing system includes the TMA sensors along with their non-magnetic platform/frame and host computer, neither of which is shown in FIG. 8 for clarity of illustration. With this arrangement, a much more robust application of the present invention's scalar triangulation and ranging concept can be used to uniquely determine relative bearing to, and range of, the target with respect to the sensing system. Furthermore, a single data set taken at a single position of the sensing system also will provide a more complete set of target classification information with respect to the magnitude and direction of target dipole strength.

Sensing system 500 includes eight TMA sensors 502–516 arranged at the vertices of a rectangular parallelepiped with all sense axes being parallel to one another. This arrangement is essentially the equivalent of six planar sensor systems of the type described above with respect to sensing system 300. This particular configuration enables development of an adaptive "beam-finding" approach wherein the sets of planar sensor systems that are closest to target 50 are selected for development of the most accurate target localization information. Compared to planar sensing system 300, multi-planar sensing system 500 provides:

More robust scalar signals for target detection and localization owing to the use of a multiplicity of over-described gradient matrices and simple scalar addition of multiple signals.

Unique target localization information from a single point measurement.

Sufficient information to determine effective magnitude and direction of the magnetic moment of target 50 from a single point measurement.

The six planar sensors of sensing system 500 comprise combinations of pairs of parallel planar systems that are disposed along the sensor system coordinate axes in the following way:

Along the X-axis, TMA sensors 502–508 lie in a plane that is parallel to and separated a distance $S_x$ from the plane containing TMA sensors 510–516.

Along the Y-axis, TMA sensors 504, 506, 512 and 514 lie in a plane that is parallel to and separated a distance $S_Y$ from the plane containing TMA sensors 502, 508, 510 and 516.

Along the Z-axis, TMA sensors 502, 504, 510 and 512 lie in a plane that is parallel to and separated a distance $S_Z$ from the plane containing TMA sensors 506, 508, 514 and 516.

Figure 9:
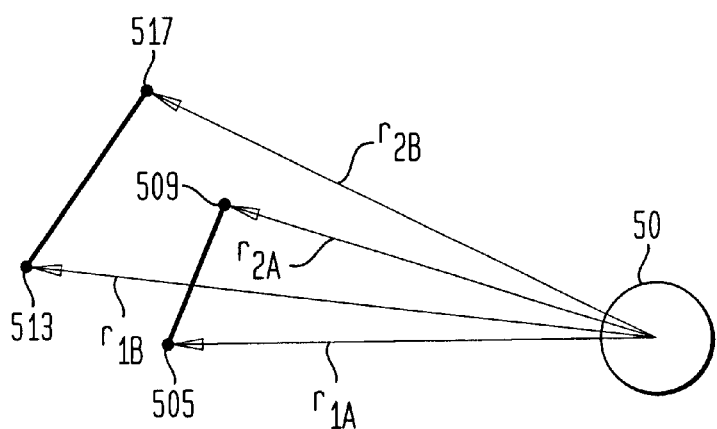
FIG. 9 is a diagrammatic view of the geometric relationships between four sense axes and a magnetic target for the multi-planar magnetic anomaly sensing system in FIG. 8.

The magnetic anomaly localization and classification method for this three-dimensional system is an extension of the scalar triangulation and ranging method that was outlined for planar sensing system 300. The following example outlines essential details of the procedure. First, consider the problem of target localization using the sensor planes perpendicular to the X-axis. In FIG. 8, these planes are composed of TMA sensors 502–508 (plane "A") and TMA sensors 510–516 (plane "B"), and are separated a distance $S_x$ along the X-axis. FIG. 9 shows the relative configuration (as seen from the +Z axis) of sensor axes 505/509 and 513/517 that are contained in the planes, and the lines of position $r_{1A}$, $r_{1b}$, $r_{2A}$ and $r_{2B}$ to target 50. From this perspective, it is apparent that the target localization problem basically consists of successive applications of the method outlined in steps 400–406 for planar sensing system 300. That is, each successive application is carried out with respect to a pair of planar sense axes, e.g., axes 505 and 509.

Figure 10:
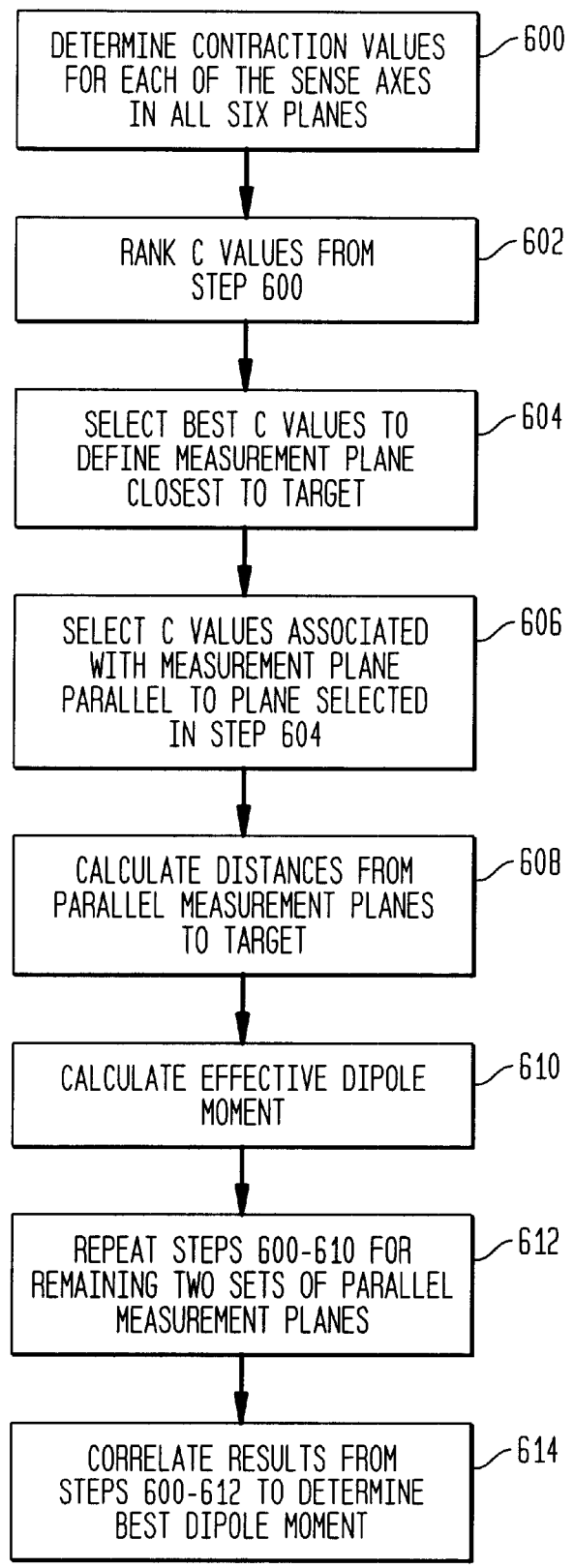
FIG. 10 is a flow diagram depicting the operation steps for the multi-planar magnetic anomaly sensing system.

Referring additionally to FIG. 10, a flow diagram is shown depicting the operation of sensing system 500. At step 600, the derived C-values are determined for each of the sense axes in each of the six planes of sensing system 500. This step essentially determines a set of derived C-values $C_X$, $C_Y$, $C_Z$ for each planar surface of the parallelepiped by following step 400 described above. At step 602, the C-values are ranked with respect to absolute magnitude and closeness in value to C-values of other sense axes. Following ranking step 602, the sets of C-values with the largest and most closely matched values are selected at step 604. For example, this would define the "A" plane for the example shown in FIG. 8, and consequently the particular sensor system coordinate direction that is most closely aligned with the relative bearing to target 50. At step 606, the C-values associated with the plane parallel to the "A" plane, i.e., the "B" plane, are selected. At step 608, the distances $r_{1A}$, $r_{2A}$, $r_{1B}$ and $r_{2B}$, to sensor axes 505, 509, 513 and 517, respectively, are determined from the C-values as described above in step 402. The effective dipole moment M' of target 50 can be determined at step 610 as described above in step 406. At step 612, steps 600–610 can be repeated for each of the other two sets of parallel planes defined by the TMA sensors. The repetition provided by step 612 is optional. However, by repeating the measurements for other sets of planes, the accuracy of target localization may be improved. For certain locations of target with respect to the sensor configuration, e.g., target located very close to a plane that happens to contain two body diagonals of the parallelepiped, there may some ambiguity as to which plane actually is most closely aligned with the relative bearing to target.

Finally, at step 614, the results of steps 600–612 are correlated to uniquely indicate the three-dimensional components, in the sensor system reference frame, of the relative position vector of target 50 with respect to sensing system 500 and determine the best value for the target's dipole moment M'. The term "best" here means the most accurate, or really, the average value of M' that is obtained from the different sets of measurements. The quantity M' actually is an "effective" scalar magnitude of the target's vector magnetic dipole moment. The word "effective" here reflects the fact that, for a given distance r from a target with a "true" dipole moment M (with true magnitude M), the gradient contraction is a relatively slowly varying function of angular position of the gradiometer's location in space with respect to the target. Therefore, the value of M' that results from the scalar triangulation and ranging process is not quite equal to the target's true (and constant) moment M. Once a relative bearing vector r from sensor to target has been uniquely determined, the true value of M and its components can be determined.

The multi-axis, multi-planar, three-dimensional sensing system 500 shown in FIG. 8 represents an embodiment of the invention that can provide unambiguous target detection, localization and classification tasks for any target located within the sensor system's detection space. The innovative motion compensated sensor design and the use of rotationally invariant scalar triangulation and ranging allow the magnetic anomaly localization functions to be performed for all orientations of the sensor platform and without any need for the sensor to move along a straight line track.

The advantages of the present invention are numerous. First, the present invention provides an innovative use of field point sensing elements that combine triaxial vector magnetometers and triaxial accelerometers, in very close proximity, to measure the three-dimensional components of magnetic and acceleration fields at essentially the same point. Second, the method of operation of the various embodiments for localization of magnetic anomalies makes innovative use of the mathematically rotationally invariant and robust properties of the magnetic dipole field gradient tensor contraction to develop a new technique for localization of magnetic anomalies by "scalar triangulation and ranging". Thus, the combination of motion-compensated sensor system embodiments with an innovative rotationally invariant scalar approach for target localization results in a magnetic anomaly sensing system having robust target localization capabilities that are insensitive to variations in sensor platform orientation.

The sensing system and method described herein are primarily designed for self-contained, portable devices to be used for detection, localization and classification of magnetic anomalies associated with ferrous objects. In practical use, a human operator or robotic vehicle would move the sensor platform in an arbitrary search pattern that scans a region to detect the presence of targets of interest. When the system is moved so that a target is within its total field detection range, the invention develops a pseudo robust signal that can help guide the system toward the target. Within the gradient contraction detection range, the invention develops a very robust signal that unequivocally can be used by the operator to home in on the target. The amount of target localization and classification information that can be extracted from the signal depends on the number of gradient channels and level of sophistication built into the sensing system's signal processing section.

For the simplest case represented by sensing system 100, the invention can be used as a relatively simple proximity detector in which signal amplitude changes monotonically with changes in sensor-to-target distance. For more complex configurations such as those represented by sensing systems 300 and 500, the system can perform relatively sophisticated magnetic anomaly detection, localization and classification functions including measurement of target position vector r and moment vector M relative to the sensor platform, and some limited determination of target geometry and composition. For mine countermeasures operations, this information would provide a critical capability for discrimination between real targets and background clutter.

The present invention's system and methodology are applicable to a wide variety of commercial and military uses owing to their improved ability to provide robust target detection and localization capabilities from platforms that are undergoing large, rapid changes in orientation. The following list includes some important applications for the magnetic anomaly sensing system and method:

Practical mine countermeasure applications requiring highly mobile and accurate magnetic sensors for robust detection, localization and classification of ferrous mines.

Underwater navigation applications that require robust magnetic localization capabilities for, e.g., guidance systems that allow Navy divers or autonomous underwater vehicles to navigate by using ultra low frequency magnetic beacons.

Practical magnetic anomaly and magnetic object detection, localization and classification applications including conventional surveying, detection of underwater and/or subterranean pipes and steel cables, treasure hunting, archeological investigations, and geological research.

Although the invention has been described relative to a specific embodiment thereof, there are numerous variations and modifications that will be readily apparent to those skilled in the art in light of the above teachings. For example, a planar magnetic anomaly sensing system could also be constructed with TMA sensors at the three vertices of a triangle. Such a system provides robust target detection and directional information for a mobile platform while minimizing the number of TMA sensors and calibrations/calculations needed. It is therefore to be understood that, within the scope of the appended claims, the invention may be practiced other than as specifically described.

What is claimed as new and desired to be secured by Letters Patent of the United States is:

1. A magnetic anomaly sensing system, comprising:

a support that is electrically non-conductive and non-magnetic;

at least one pair of triaxial magnetometer-accelerometer (TMA) sensors coupled to said support and separated by a known distance, each of said TMA sensors having X, Y, Z magnetic sensing axes and X, Y, Z acceleration sensing axes that are parallel to one another and parallel to said X, Y, Z magnetic sensing axes and X, Y, Z acceleration sensing axes of all others of said TMA sensors, wherein each of said TMA sensors outputs X, Y, Z components ($B_x$, $B_y$, $B_z$) of local magnetic fields and X, Y, Z components ($A_x$, $A_y$, $A_z$) of local gravitational acceleration fields;

means for processing said X, Y, Z components ($B_x$, $B_y$, $B_z$) and ($A_x$, $A_y$, $A_z$) for each of said TMA sensors to generate motion-compensated X, Y, Z components ($B_{cx}$, $C_{cy}$, $B_{cz}$) of local magnetic fields for each of said TMA sensors;

means for generating a difference between said motion-compensated X, Y, Z components ($B_{cx}$, $B_{cy}$, $B_{cz}$) for each said pair of TMA sensors to generate differential vector field components ($\Delta B_x$, $\Delta B_y$, $\Delta B_z$);

means for generating gradient components $G_{ij}$ using said differential vector field components ($\Delta B_x$, $\Delta B_y$, $\Delta B_z$) where i={x, y, z} and j={x, y, z} and wherein, for each of said X, Y, Z magnetic sensing axes, said gradient components $G_{ij}$ are defined by ($\Delta B_x/\Delta_j$, $\Delta B_y/\Delta_j$, $\Delta B_z/\Delta_j$), wherein $\Delta_j$ is a distance between said pair of TMA sensors relative to a j-th one of said X, Y, Z magnetic sensing axes; and means for generating a scalar-quantity gradient contraction $$C^2 = \sum_{i,j} (G_{ij})^2$$

for each said pair of TMA sensors wherein said gradient contraction $C^2$ changes monotonically with proximity to a magnetic target.

2. A magnetic anomaly sensing system as in claim 1 wherein each said pair of TMA sensors is positioned on said support such that only one said distance $\Delta_j$ is non-zero.

3. A magnetic anomaly sensing system as in claim 1 further comprising:

means for generating a scalar-quantity total magnetic field $B_T=[(B_{cx})^2+(B_{cy})^2+(B_{cz})^2]^{1/2}$ for each of said TMA sensors; and means for generating a sum $\Sigma B_T$ of said total magnetic field for each of said pair of TMA sensors wherein changes in said sum $\Sigma B_T$ can be correlated with said gradient contraction $C^2$.

4. A magnetic anomaly sensing system as in claim 1 wherein said at least one pair of TMA sensors comprises four TMA sensors, each of said four TMA sensors being positioned at a vertex of a planar quadrilateral, said system further comprising means for determining range and relative bearing to said magnetic target using values of said gradient contraction $C^2$ for at least two pair of said four TMA sensors positioned on opposite sides of said planar quadrilateral.

5. A magnetic anomaly sensing system as in claim 1 wherein said at least one pair of TMA sensors comprises eight TMA sensors, each of said eight TMA sensors being positioned at a vertex of a rectangular parallelepiped, said system further comprising:

means for selecting a first plane of said rectangular parallelepiped defined by four TMA sensors of said eight TMA sensors that is closest to said magnetic target as defined by values of said gradient contraction $C^2$ determined using said four TMA sensors defining said first plane; and means for determining range and relative bearing to said magnetic target using values of said gradient contraction $C^2$ determined using said four TMA sensors defining said first plane and values of said gradient contraction $C^2$ determined using four TMA sensors of said eight TMA sensors defining a second plane, said second plane opposing said first plane and being parallel thereto.

6. A magnetic anomaly sensing system as in claim 1 further comprising means for adjusting said differential vector field components ($\Delta B_x$, $\Delta B_y$, $\Delta B_z$) using said X, Y, Z components ($A_x$, $A_y$, $A_z$) of local gravitational acceleration fields and said motion-compensated X, Y, Z components ($B_{cx}$, $B_{cy}$, $B_{cz}$) of local magnetic fields in order to compensate for motion of said support.

7. A method of sensing magnetic anomalies, comprising the steps of:

providing a non-magnetic and electrically non-conductive support with at least one pair of triaxial magnetometer-accelerometer (TMA) sensors coupled thereto and separated by a known distance, each of said TMA sensors having X, Y, Z magnetic sensing axes and X, Y, Z acceleration sensing axes that are parallel to one another and parallel to said X, Y, Z magnetic sensing axes and X, Y, Z acceleration sensing axes of all others of said TMA sensors, wherein each of said TMA sensors outputs X, Y, Z components ($B_x$, $B_y$, $B_z$) of local magnetic fields and X, Y, Z components ($A_x$, $A_y$, $A_z$) of local gravitational acceleration fields;

generating motion-compensated X, Y, Z components ($B_{cx}$, $B_{cy}$, $B_{cz}$) of local magnetic fields for each of said TMA sensors using said X, Y, Z components ($B_x$, $B_y$, $B_z$) and ($A_x$, $A_y$, $A_z$) for each of said TMA sensors;

generating a difference between said motion-compensated X, Y, Z components ($B_{cx}$, $B_{cy}$, $B_{cz}$) for each said pair of TMA sensors to generate differential vector field components ($\Delta B_x$, $\Delta B_y$, $\Delta B_z$);

generating gradient components $G_{ij}$ using said differential vector field components ($\Delta B_x$, $\Delta B_y$, $\Delta B_z$) where i={x, y, z} and j={x, y, z} and wherein, for each of said X, Y, Z magnetic sensing axes, said gradient components $G_{ij}$ are defined by $(\Delta B_x/\Delta_j, \Delta B_y/\Delta_j, \Delta B_z/\Delta_j)$ wherein $\Delta_j$ is a distance between said pair of TMA sensors relative to a j-th one of said X, Y, Z magnetic sensing axes; and generating a scalar-quantity gradient contraction $$C^2 = \sum_{i,j} (G_{ij})^2$$

for each said pair of TMA sensors wherein said gradient contraction $C^2$ changes monotonically with proximity to a magnetic target.

8. A method according to claim 7 further comprising the step of positioning each said pair of TMA sensors on said support such that only one said distance $\Delta_j$ is non-zero for each said pair of TMA sensors.

9. A method according to claim 7 further comprising the steps of:
generating a scalar-quantity total magnetic field $B_T = [(B_{cx})^2 + (B_{cy})^2 + (B_{cz})^2]^{1/2}$ for each of said TMA sensors;
generating a sum $\Sigma B_T$ of said total magnetic field for each of said pair of TMA sensors; and
correlating changes in said sum $\Sigma B_T$ with said gradient contraction $C^2$.

10. A method according to claim 7 wherein said at least one pair of TMA sensors comprises four TMA sensors, said method further comprising the steps of:
positioning each of said four TMA sensors at a vertex of a planar quadrilateral; and
determining range and relative bearing to said magnetic target using values of said gradient contraction $C^2$ for at least two pair of said four TMA sensors positioned on opposite sides of said planar quadrilateral.

11. A method according to claim 7 wherein said at least one pair of TMA sensors comprises eight TMA sensors, said method further comprising the steps of:
positioning each of said eight TMA sensors at a vertex of a rectangular parallelepiped;
selecting a first plane of said rectangular parallelepiped defined by four TMA sensors of said eight TMA sensors that is closest to said magnetic target as defined by values of said gradient contraction $C^2$ determined using said four TMA sensors defining said first plane; and
determining range and relative bearing to said magnetic target using values of said gradient contraction $C^2$ determined using said four TMA sensors defining said first plane and values of said gradient contraction $C^2$ determined using four TMA sensors of said eight TMA sensors defining a second plane, wherein said second plane opposes said first plane and is parallel thereto.

12. A method according to claim 7 further comprising the step of adjusting said differential vector field components $(\Delta B_x, \Delta B_y, \Delta B_z)$ using said X, Y, Z components $(A_x, A_y, A_z)$ of local gravitational acceleration fields and said motion-compensated X, Y, Z components $(B_{cx}, B_{cy}, B_{cz})$ of local magnetic fields in order to compensate for motion of said support.

13. A magnetic anomaly sensing system, comprising:
a support that is electrically non-conductive and non-magnetic;
a pair of triaxial magnetometer-accelerometer (TMA) sensors coupled to said support, each of said TMA sensors having X, Y, Z magnetic sensing axes and X, Y, Z acceleration sensing axes that are parallel to one another and parallel to said X, Y, Z magnetic sensing axes and X, Y, Z acceleration sensing axes of another of said TMA sensors, said pair of TMA sensors being positioned such that a known distance A separates said TMA sensors along only one coordinate axis of said X, Y, Z magnetic sensing axes and said X, Y, Z acceleration sensing axes, wherein each of said TMA sensors outputs X, Y, Z components $(B_x, B_y, B_z)$ of local magnetic fields and X, Y, Z components $(A_x, A_y, A_z)$ of local gravitational acceleration fields;
means for processing said X, Y, Z components $(B_x, B_y, B_z)$ and $(A_x, A_y, A_z)$ for each of said TMA sensors to generate motion-compensated X, Y, Z components $(B_{cx}, B_{cy}, B_{cz})$ of local magnetic fields for each of said TMA sensors;
means for generating a difference between said motion-compensated X, Y, Z components $(B_{cx}, B_{cy}, B_{cz})$ for said pair of TMA sensors to generate differential vector field components $(\Delta B_x, \Delta B_y, \Delta B_z)$;
means for generating gradient components $G_i$ using said differential vector field components $(\Delta B_x, \Delta B_y, \Delta B_z)$ where i={x, y, z} and wherein, for each of said X, Y, Z magnetic sensing axes, said gradient components $G_i$ are defined by $(\Delta B_x/\Delta, \Delta B_y/\Delta, \Delta B_z/\Delta)$; and
means for generating a scalar-quantity gradient contraction $$C^2 = \sum_{i} (G_i)^2$$

for said pair of TMA sensors wherein said gradient contraction $C^2$ changes monotonically with proximity to a magnetic target.

14. A magnetic anomaly sensing system as in claim 13 further comprising means for adjusting said differential vector field components $(\Delta B_x, \Delta B_y, \Delta B_z)$ using said X, Y, Z components $(A_x, A_y, A_z)$ of local gravitational acceleration fields and said motion-compensated X, Y, Z components $(B_{cx}, B_{cy}, B_{cz})$ of local magnetic fields in order to compensate for motion of said support.

15. A method for sensing magnetic anomalies, comprising the steps of:
a) providing a non-magnetic and electrically non-conductive support with a pair of triaxial magnetometer-accelerometer (TMA) sensors coupled thereto, each of said TMA sensors having X, Y, Z magnetic sensing axes and X, Y, Z acceleration sensing axes that are parallel to one another and parallel to said X, Y, Z magnetic sensing axes and X, Y, Z acceleration sensing axes of another of said TMA sensors;
b) positioning said pair of TMA sensors on said non-magnetic support such that a known distance A separates said TMA sensors along only one coordinate axis of said X, Y, Z magnetic sensing axes and said X, Y, Z acceleration sensing axes;
c) moving said non-magnetic support with said pair of TMA sensors coupled thereto to a measurement location wherein each of said TMA sensors outputs X, Y, Z components $(B_x, B_y, B_z)$ of local magnetic fields and X, Y, Z components $(A_x, A_y, A_z)$ of local gravitational acceleration fields;
d) generating motion-compensated X, Y, Z components $(B_{cx}, B_{cy}, B_{cz})$ of local magnetic fields for each of said TMA sensors using said X, Y, Z components $(B_x, B_y, B_z)$ and $(A_x, A_y, A_z)$ for each of said TMA sensors;
e) generating a difference between said motion-compensated X, Y, Z components $(B_{cx}, B_{cy}, B_{cz})$ for said pair of TMA sensors to generate differential vector field components $(\Delta B_x, \Delta B_y, \Delta B_z)$;

f) generating gradient components $G_j$ using said differential vector field components ($\Delta B_x$, $\Delta By_1$ $\Delta B_z$) where i={x, y, z} and wherein, for each of said X, Y, Z magnetic sensing axes, said gradient components $G_i$ are defined by ($\Delta B_x/\Delta$, $\Delta B_y/\Delta$, $\Delta B_z/\Delta$);

g) generating a scalar-quantity gradient contraction $$C^2 = \sum_i (G_i)^2$$

for said pair of TMA sensors; and h) repeating steps c)–g) for a second measurement location wherein said gradient contraction $C^2$ changes monotonically with proximity to a magnetic target.

16. A method according to claim 15 further comprising the step of adjusting said differential vector field components ($\Delta B_x$, $\Delta B_y$, $\Delta B_z$) using said X, Y, Z components ($A_x$, $A_y$, $A_z$) of local gravitational acceleration fields and said motion-compensated X, Y, Z components ($B_{cx}$, $B_{cy}$, $B_{cz}$) of local magnetic fields in order to compensate for motion of said support.

17. A magnetic anomaly sensing system, comprising:

a support that is electrically non-conductive and non-magnetic;

four triaxial magnetometer-accelerometer (TMA) sensors coupled to said support, each of said four TMA sensors being positioned at a vertex of a planar square of side length S and having X, Y, Z magnetic sensing axes and X, Y, Z acceleration sensing axes that are parallel to one another and parallel to said X, Y, Z magnetic sensing axes and X, Y, Z acceleration sensing axes of all others of said TMA sensors, wherein each of said TMA sensors outputs X, Y, Z components ($B_x$, $B_y$, $B_z$) of local magnetic fields and X, Y, Z components ($A_x$, $A_y$, $A_z$) of local gravitational acceleration fields;

means for processing said X, Y, Z components ($B_x$, $B_y$, $B_z$) and ($A_x$, $A_y$, $A_z$) for each of said TMA sensors to generate motion-compensated X, Y, Z components ($B_{cx}$, $B_{cy}$, $B_{cz}$) of local magnetic fields for each of said TMA sensors;

means for generating a difference between said motion-compensated X, Y, Z components ($B_{cx}$, $B_{cy}$, $B_{cz}$) for pairs of said TMA sensors positioned on opposite sides of said planar square to generate differential vector field components ($\Delta B_x$, $\Delta B_y$, $\Delta B_z$) for each of said pairs;

means for generating gradient components $G_i$ for each of said pairs using said differential vector field components ($\Delta B_x$, $\Delta B_y$, $\Delta B_z$) where i={x, y, z} and wherein, for each of said X, Y, Z magnetic sensing axes, said gradient components G, are defined by ($\Delta B_x/S$, $\Delta B_y/S$, $\Delta B_z/S$);

means for generating a scalar-quantity gradient contraction $$C^2 = \sum_i (G_i)^2$$

for each of said pairs; and means for determining range and relative bearing to a magnetic target using values of said gradient contraction $C^2$ for said pairs positioned on opposite sides of said planar square.

18. A magnetic anomaly sensing system as in claim 17 further comprising means for adjusting said differential vector field components ($\Delta B_x$, $\Delta B_y$, $\Delta B_z$) using said X, Y, Z components ($A_x$, $A_y$, $A_z$) of local gravitational acceleration fields and said motion-compensated X, Y, Z components ($B_{cx}$, $B_{cy}$, $B_{cz}$) of local magnetic fields in order to compensate for motion of said support.

19. A method for sensing magnetic anomalies, comprising the steps of:

a) providing a non-magnetic and electrically non-conductive support with four triaxial magnetometer-accelerometer (TMA) sensors coupled thereto, each of said TMA sensors being positioned at a vertex of a planar square of side length S and having X, Y, Z magnetic sensing axes and X, Y, Z acceleration sensing axes that are parallel to one another and parallel to said X, Y, Z magnetic sensing axes and X, Y, Z acceleration sensing axes of all others of said TMA sensors;

b) moving said non-magnetic support with said four TMA sensors coupled thereto to a measurement location wherein each of said TMA sensors outputs X, Y, Z components ($B_x$, $B_y$, $B_z$) of local magnetic fields and X, Y, Z components ($A_x$, $A_y$, $A_z$) of local gravitational acceleration fields;

c) generating motion-compensated X, Y, Z components ($B_{cx}$, $B_{cy}$, $B_{cz}$) of local magnetic fields for each of said TMA sensors using said X, Y, Z components ($B_x$, $B_y$, $B_z$) and ($A_x$, $A_y$, $A_z$) for each of said TMA sensors;

d) generating a difference between said motion-compensated X, Y, Z components ($B_{cx}$, $B_{cy}$, $B_{cz}$) for pairs of TMA sensors positioned on opposite sides of said planar square to generate differential vector field components ($\Delta B_x$, $\Delta B_y$, $\Delta B_z$) for each of said pairs;

e) generating gradient components Gi for each of said pairs using said differential vector field components ($\Delta B_x$, $\Delta B_y$, $\Delta B_z$) where i=(x, y, z) and wherein, for each of said X, Y, Z magnetic sensing axes, said gradient components $G_j$ are defined by ($\Delta B_x/\Delta$, $\Delta B_y/\Delta$, $\Delta B_z/\Delta$);

f) generating a scalar-quantity gradient contraction $$C^2 = \sum_i (G_i)^2$$

for each of said pairs of TMA sensors; and g) repeating steps b)–f) for a second measurement location wherein said gradient contraction $C^2$ changes monotonically with proximity to a magnetic target.

20. A method according to claim 19 further comprising the step of adjusting said differential vector field components ($\Delta B_x$, $\Delta B_y$, $\Delta B_z$) using said X, Y, Z components ($A_x$, $A_y$, $A_z$) of local gravitational acceleration fields and said motion-compensated X, Y, Z components ($B_{cx}$, $B_{cy}$, $B_{cz}$) of local magnetic fields in order to compensate for motion of said support.

* * * * *